United States Patent [19]

Matzner

[11] Patent Number: 5,219,519
[45] Date of Patent: Jun. 15, 1993

[54] INCREASED FUEL COLUMN HEIGHT FOR BOILING WATER REACTOR FUEL RODS

[75] Inventor: Bruce Matzner, San Jose, Calif.

[73] Assignee: General Electric Company, San Jose, Calif.

[21] Appl. No.: 839,424

[22] Filed: Feb. 21, 1992

[51] Int. Cl.⁵ .................................................. G21C 3/00
[52] U.S. Cl. .................................... 376/412; 376/420; 376/426; 376/429; 376/433
[58] Field of Search ............... 376/435, 428, 412, 420, 376/426, 429, 433; 976/DIG. 39, DIG. 38

[56] References Cited

U.S. PATENT DOCUMENTS

| | | | |
|---|---|---|---|
| 3,257,285 | 6/1966 | Clifford et al. | 376/436 |
| 3,816,248 | 6/1974 | Cayol et al. | 376/436 |
| 4,011,134 | 3/1977 | Stehle et al. | 376/418 |
| 4,054,487 | 10/1977 | Fujibayashi | 376/412 |
| 5,017,332 | 5/1991 | Dix et al. | 376/370 |

Primary Examiner—Donald P. Walsh
Assistant Examiner—Meena Chelliah
Attorney, Agent, or Firm—John S. Beulick

[57] ABSTRACT

A fuel bundle is disclosed in which interspersed part length fuel rods define between the end of the fuel rods and the upper tie plate void regions which are not otherwise occupied. Full length fuel rods adjacent to these regions are provided with an expanded upper plenum region which effectively increases the fuel rod diameter at the end of the upper two phase region of the fuel bundle. Under normal circumstances and a fuel bundle with only full length fuel rods, such an expansion of the upper regions of the fuel rods would cause unacceptable pressure drop. Where such expansion occurs adjacent the vacated volumes created by the part length fuel rods, unacceptable pressure drop does not occur. Consequently, and with the expanded plenum volume, a longer length of active fuel pellets can be accommodated within the full length fuel rods.

10 Claims, 2 Drawing Sheets

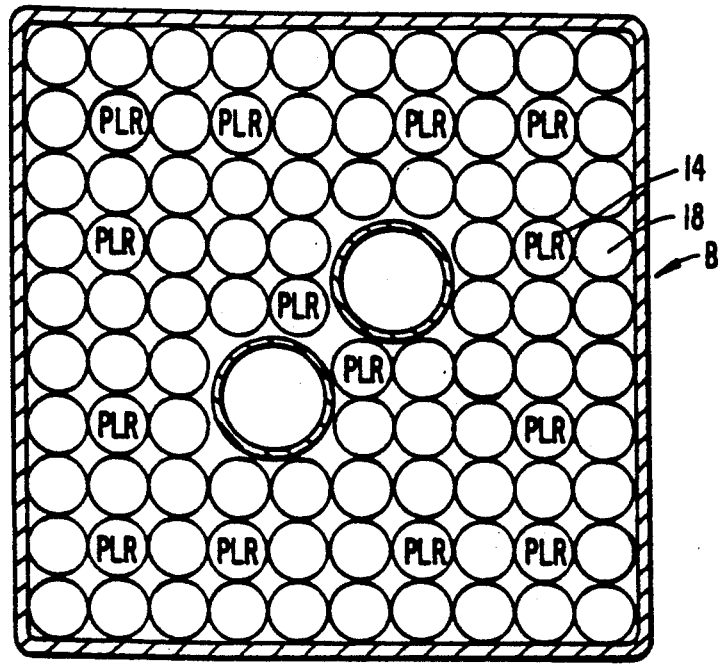
FIG. 2.
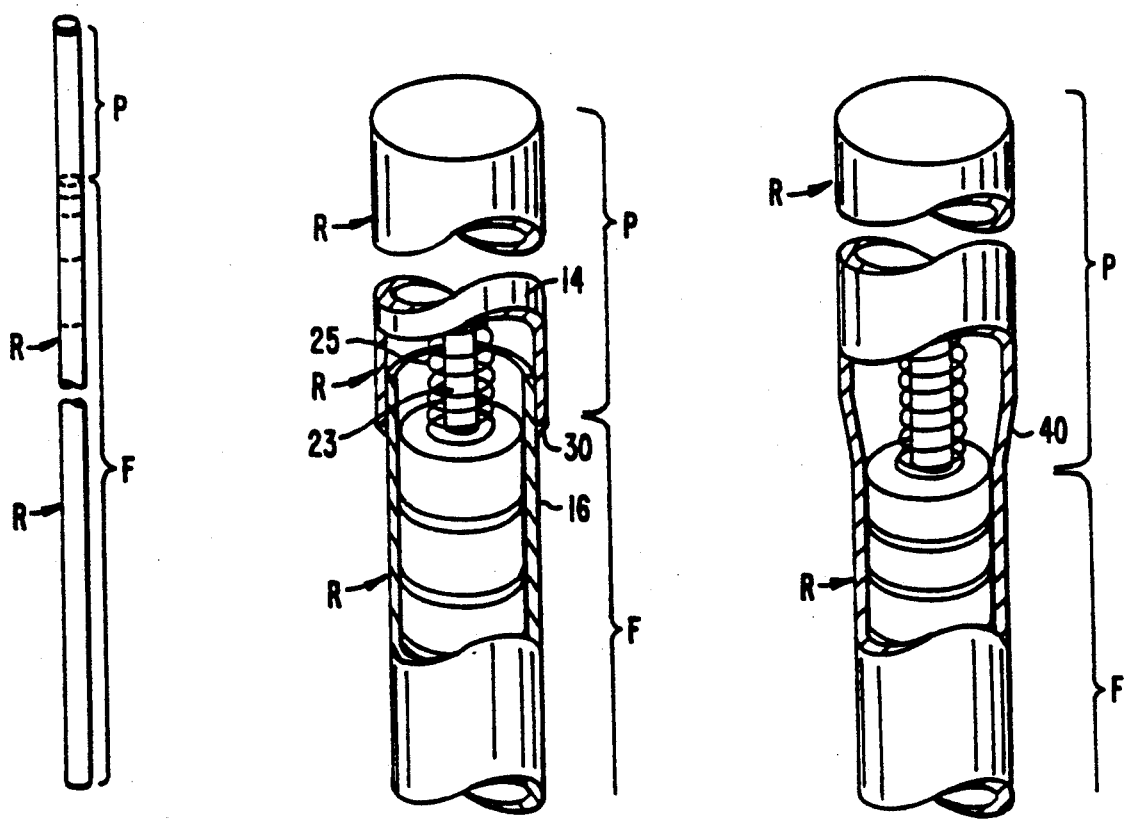
FIG. 3.
PRIOR ART
FIG. 4.
FIG. 5.

INCREASED FUEL COLUMN HEIGHT FOR BOILING WATER REACTOR FUEL RODS

This invention relates to fuel bundles for boiling water nuclear reactors. More specifically, in combination with part length fuel rods—fuel rods which extend only part of the distance from the lower tie plate to the upper tie plate and terminate a distance below the upper tie plate—longer full length fuel rods with increased diameter gas plenums are disclosed. Simply stated, the expanded cross section area in the upper two phase region of the fuel bundle resulting from the insertion of part length fuel rods between full length fuel rods is utilized as an area to accommodate increased cross sectional area plenums. There results the ability of the full length fuel rods to accommodate a small additional plenum gas volume with the result that a greater length of active fuel volume can be utilized with the full length fuel rods.

BACKGROUND OF THE INVENTION

Fuel bundle designs for boiling water nuclear reactors are known. Such fuel bundle designs are fabricated in a standard fashion including a lower tie plate for supporting an upstanding matrix of fuel rods in side-by-side relation and permitting the inflow of water coolant into the fuel bundle. Most of the fuel rods of such a fuel bundle design extend from the supporting lower tie plate to an upper tie plate. This upper tie plate serves to maintain the fuel rods in upstanding side-by-side relation and to permit the exit of water and generated steam from the fuel bundle.

The fuel bundle is typically surrounded by a fuel bundle channel, which channel surrounds the lower tie plate, extends upwardly around the fuel rod matrix, and surrounds the upper tie plate. This fuel bundle channel isolates the flow path through the fuel bundle so that water and steam generated in the interior the fuel bundle are separate from the so-called core bypass region surrounding the fuel bundle. This core bypass region contains water moderator and occupies generally cruciform shaped volumes between the fuel channels into which control rods can penetrate for the absorption of thermal neutrons for the control of the nuclear reaction.

In operation of the boiling water nuclear reactor fuel bundles, liquid moderator—water—is introduced at the bottom of the fuel bundle through the lower tie plate. The water passes upwardly interior of the fuel bundle and performs two major functions. First, it moderates so-called fast or high velocity neutrons produced in the nuclear reaction to slow or thermalized neutrons needed to continue the nuclear fission reaction. Secondly, the water moderator generates the steam which is utilized for the generation of power.

It will be understood that the fuel rods interior of the fuel channels are long slender sealed tubes containing fissionable material and are flexible. If such fuel bundle were to be unrestrained, they would vibrate and even come into abrading contact with one another during the generation of steam. To restrain this tendency as well as maintain the fuel rods in their designed side-by-side spacing for efficient nuclear operation, so-called spacers are utilized. These spacers are placed at selected vertical intervals within the fuel bundle. Usually, seven evenly distributed fuel rod spacers are utilized in a fuel bundle having an overall length in the order of 160 inches. These spacers surround each individual fuel rod maintaining the precise designed spacing of the fuel rods along the entire length of the fuel bundle.

So-called part length rods have been introduced into this standard fuel bundle construction environment. These part length fuel rods extend from the lower tie plate only partially the distance to the upper tie plate. The fuel rods typically terminate underlying the upper tie plate so as to define an unoccupied vertical interval within the fuel bundle starting at the top of the part length fuel rod and extending to the upper tie plate. These part length fuel rods have many advantages, which advantages are summarized in Dix et al. U.S. Pat. No. 5,017,332 entitled Two Phase Pressure Drop Reduction BWR Assembly Design issued May 21, 1991.

One of the greatest single advantages of part length fuel rods is the reduction of pressure drop in the upper two phase region of the fuel bundle. Simply stated, in the upper two phase region of the fuel bundle, void volumes are defined between the ends of the part length fuel rods and the upper tie plate. With the omitted fuel rod volumes overlying the part length fuel rods in the upper two phase region of the fuel bundle, the two phase water/steam mixture present within the fuel bundle is freer to move in the vacated region. This being the case, the realized pressure drop in this region of the fuel bundle is lessened. While it is not the purpose of this disclosure to be a primer on the operation (and pressure drop variations) of nuclear fuel bundles, the reader can understand that reduced pressure drop can be an advantage.

Modern fuel bundles and the contained fuel rods also contain another limitation. Specifically, and during the operation of the fuel bundles, fission gas accumulates interior of the fuel rods of the fuel bundle. To fully understand this phenomenon, the construction of fuel rods should first be reviewed with the necessity of fission gas accumulation being summarized thereafter.

The discrete fuel rods within fuel bundles are typically sealed Zircalloy tubes. These sealed Zircalloy tubes contain the nuclear fuel in pellet format stacked typically in pellets occupying the almost the full diameter of the tubes. It has been found advantageous to first evacuate and thereafter fill the sealed tubes with an inert gas under pressure to provide better heat transfer between the fuel pellets and the enclosing zircalloy tubes as well as reduction of fission gas emission during the in service life of the fuel bundle.

When the fissionable materials interior of the sealed fuel rods are subjected to nuclear reaction, certain "daughter" fission gasses are produced. It is the primary purposed of the fuel rods—or cladding—around the fuel pellets to contain this gas.

Inert gas, usually helium, is added to the interior of sealed fuel rods containing fissionable material. Typically, a vacuum is first drawn on the sealed interior of the fuel rod. Substantially all oxygen and water is withdrawn from the interior of the fuel rod. Thereafter, helium under pressure is added. This helium under pressure is a good heat transfer medium - serving to keep the fuel pellets relatively cool and causing heat to be conducted away from the pellets for the production of energy producing steam. At the same time, the fuel pellets during their in service life are maintained in a cooler state where less "daughter" fission gases are produced.

It is important that helium added to the fuel rod be provided with a sufficient plenum volume. This plenum volume maintains the helium within the desired density and pressure range between the fuel pellets and cladding during the full in service life of the fuel rod within the fuel bundle. At the beginning of inservice life, the pressurized helium provides a pressure interior of the fuel rod that balances the pressure exterior of the fuel rod. At the end of in service life, sufficient expansion volume is present to prevent the cladding of the fuel rod from becoming over pressurized with resultant gas leakage.

Calculation for the amount of expansion volume required for the so-called plenum region of any fuel rod in any fuel bundle design is a known art. Over simplified, the calculation of this required plenum volume is a function of the fuel mixture utilized, the energy extracted from the total operation of the fuel rod at the end of life of the fuel bundle, the residence time of the fuel bundle in the reactor, exposure to the various fluxes present within the reactor and other factors which results in a fission gas pressure whose value must be limited to prevent excessive strain in the fuel rod tubing.

It will be understood that normally fuel bundles have a length on the order of 160 inches. Of this total length of about 160 inches, some 150 inches of length of the fuel bundles can be occupied by active fuel. As a practical matter, active fuel is never placed in a fuel bundle at lengths greater than 150 inches because the resultant radiation exposure—typically at the top portion of the core—is undesirable with modern reactor design.

Unfortunately, and even with 150 inches available for active fuel, certain fuel designs require excessive plenum volumes. That is to say that even with a fuel rod that is 160 inches long and loaded fuel potentially occupying 150 inches of that total vertical dimension, the remain 10 inches of space within the fuel rod do not define a sufficient plenum volume. By way of example, designs are known in which only 144 inches of the total available 150 inches can be loaded with fuel. The remaining volume is required for the gas plenum of the fuel rods.

SUMMARY OF THE INVENTION

A fuel bundle is disclosed in which interspersed part length fuel rods define between the end of the fuel rods and the upper tie plate void regions which are not otherwise occupied. Full length fuel rods adjacent to these regions are provided with an expanded upper plenum region which effectively increases the fuel rod diameter at the end of the upper two phase region of the fuel bundle. Under normal circumstances and a fuel bundle with only full length fuel rods, such an expansion of the upper regions of the fuel rods would cause unacceptable pressure drop. Where such expansion occurs adjacent the vacated volumes created by the part length fuel rods, unacceptable pressure drop does not occur. Consequently, and with the expanded plenum volume, a longer length of active fuel pellets can be accommodated within the full length fuel rods. Two expedients of expanded plenum regions are disclosed. A first expedient includes welding on an expanded cylindrical end to the fuel rods. A second expedient include a bell shaped and expanded plenum region which can be preferably fabricated by omitting to draw down completely the upper dimension of the tube during normal tube draw down fabrication.

An example of the possible benefits of this invention can be set forth. Reactors can accommodate up to 150 inches of fuel without exceeding the fuel design limitations of the reactor vessel and its components. Utilizing present convention single internal diameter fuel designs with required plenum volumes, only 146 inches of fuel are in fact within the fuel rods. By utilizing the expanded plenums herein set forth, additional fuel up to the full 150 inches can added.

It will be appreciated that with many designs, this concept can be applied to all full length fuel rods.

BRIEF DESCRIPTION OF THE DRAWINGS

FIG. 2 is a plan view of the fuel bundle of FIG. 1 illustrating the typical locations of the part length fuel rods and full length rods within the upper region of the fuel bundle of FIG. 1;

FIG. 3 is a prior art illustration in cross section of a standard design of fuel rod illustrating in cut away section the plenum region;

FIG. 4 is an illustration of a fuel rod having an expanded end cap construction shown for comparison with the fuel rod plenum region of FIG. 3; and, FIG. 5 is an illustration similar to FIG. 4 showing a bell shaped construction of the expanded plenum region utilizing a fuel rod having an expanded bell shaped end adjacent the upper plenum region.

DESCRIPTION OF THE PREFERRED EMBODIMENT

Figure 1:
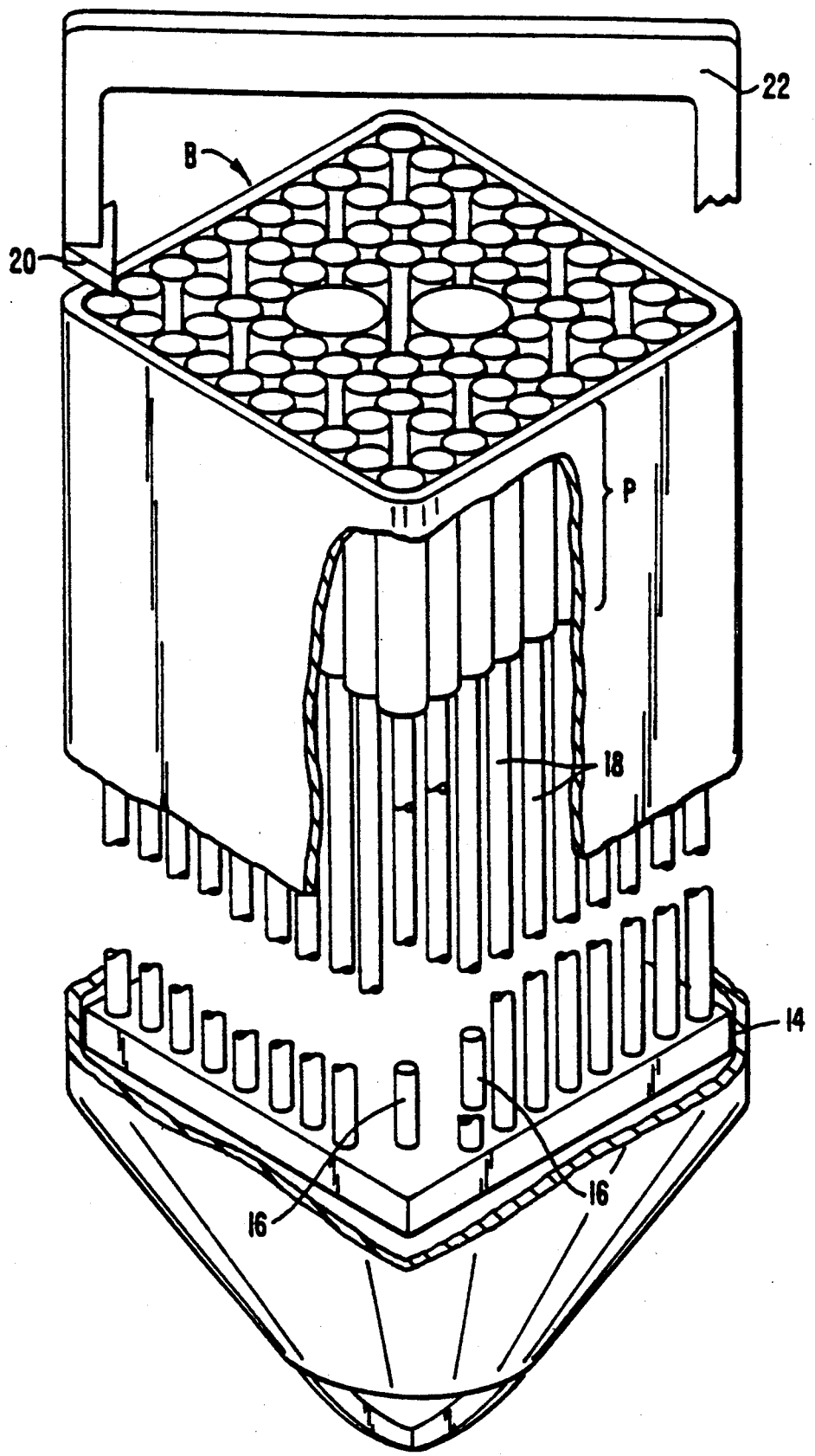
FIG. 1 is a perspective cut away view of a fuel bundle of this design showing the upper two phase region of the fuel bundle in cut away perspective to that the regions of the expanded plenums on the full length fuel rods can be seen and understood.

Referring to FIG. 1, a perspective broken away view of a fuel bundle B incorporating the invention herein is shown. A lower tie plate 14 is shown supporting a matrix of vertically upstanding fuel rods. Fuel rods shown are part length fuel rods 16 and full length fuel rods 18. All fuel rods 16, 18 are supported on lower tie plate 14 with the full length fuel rods here shown extending to and support at upper tie plate 20 with a fuel bundle handling bail 22 shown partially protruding from upper tie plate 20.

Operation of the fuel bundle is easy to summarize. Single phase water moderator is admitted to fuel bundle B through lower tie plate 14 about fuel rods 16, 18. As the single phase moderator passes upward about fuel rods 16, 18, steam is generated yielding an upward rising two phase steam/water mixture at the top of fuel bundle B. This two phase mixture passes outward through upper tie plate 20 with the steam fraction being utilized for the generation of power.

The difference between the fuel bundle here illustrated and the prior art is plenum region P. To explain this region, reference is made to FIGS. 3, 4, and 5.

Referring to FIG. 3, a prior art fuel rod R' is illustrated. Over simplified, fuel rod includes an upper plenum region P and a lower fuel pellet region F. Typically, region F can be in a length up to 150 inches of length—although as set forth above this length is frequently reduced because of fission gas producing vagaries of any particular fuel design. It is where such a reduction occurs, that the fuel rod plenum design of this invention is useful.

Referring to FIG. 4, the preferred embodiment of this invention is illustrated. Only the top portion of the fuel rod is shown with just the upper portion of fuel pellet F in view. Plenum P can be seen to be expanded, it this case having an enlarged diameter section telescoping over reduced diameter section. As is standard in many fuel designs, plenum section P includes a getter chamber 23 having capability for absorption of certain gasses present. About the getter chamber 23 there is configured coil spring 25. Coil spring 25 is of standard construction and biases the fuel pellets into their designed spaced relationship.

Referring to FIG. 2, the disposition in plan of the fuel rods can be seen—this plan view showing a complete section of the fuel bundle at the top expanded plenum area of the fuel bundle B. It can clearly be seen that the part length fuel rods 14 have a reduced diameter with respect to the expanded plenum regions P on full length fuel rods 18. A weld 30 between the bottom portion of expanded plenum region P and the exterior of full length fuel rod 18 seals the fuel rod assembly.

Having portrayed this much, comment can be made about the interaction of the plenums and the part length fuel rods 14.

Normal fuel bundles with part length fuel rods 14 and full length fuel rods 18 have reduced pressure drop. For many applications, such a reduced pressure drop is highly desirable, assisting for example certain thermal hydraulic or nuclear thermal hydraulic instabilities that can make operation of a nuclear reactor at certain flow rates and power rates very questionable. Assuming no other factors, the introduction of part length fuel rods 14 in the upper two phase region of the fuel bundle produces the reduced pressure drop as against a fuel bundle having on full length fuel rods 18.

If a fuel bundle had nothing but full length fuel rods 18 and the expanded plenums P of this invention were added, unacceptable pressure drop could well be encountered in the upper two phase region of the fuel bundle. This expanded pressure drop would be the result of the expanded cross sectional area of the plenums P intruding into the exit flow area in the upper two phase plenum region of the fuel bundle. In summary, the steam water mixture being discharged from the upper two phase region of the fuel bundle B would encounter higher flow resistance and produce greater pressure drop in the upper two phase region of the fuel bundle. This higher pressure drop can render the fuel bundle B and reactor into which the fuel bundle(s) B are installed more susceptible to thermal hydraulic and nuclear thermal hydraulic instabilities.

The design shown in FIG. 1, 2, and 5 is a compromise from the thermal hydraulic pressure drop standpoint. Expanded plenums P are utilized on full length fuel rods 18. However, the presence of part length fuel rods 14 interspersed with full length fuel rods 18 defines sufficient additional outflow area for the water/vapor mixture to render the small additional pressure drop acceptable. At the same time, valuable expansion occurs in the plenum gas region P. Thus, a nuclear advantage is realized by the expanded plenum.

Referring to FIG. 5, the reader will realize that the expanded plenum P can be fabricated in numerous ways. For example, cladding (or tubing) utilized in nuclear reactors is commonly fabricated from an alloy having a relatively low neutron capture cross section known as Zircalloy. Fabrication of Zircalloy tubing in one well known process consists of "drawing down" tubes of larger diameter into tubes of smaller diameter in order to maintain desirable metallurgical characteristics. In the embodiment of FIG. 5, plenum region P' has not been completely "drawn down." Instead, the draw down process has been halted at the expanded plenum region P. It will be understood that this will produce a "bell shaped" transition 40 in the fuel rod cladding which will result in the absence of any kind of weld or joint joining the two respective sections.

It will be understood that many other expedients can be used to produce the expanded diameter plenum regions contemplated by this invention.

What is claimed is:

1. A nuclear fuel bundle having:
   a matrix of upstanding fuel rods;
   each said fuel rod including a surrounding cylindrical cladding;
   means sealing said cladding at both ends;
   a plurality of fuel pellets of fissionable material stacked interior of said fuel rods along an active length of said fuel rods;
   a region of each said fuel rods being devoid of said fuel pellets of fissionable material for defining a plenum for enabling gases of fission from said pellets of fissionable material to accumulate in said plenum;
   a lower tie plate for supporting said matrix of fuel rods and permitting the upward inflow of water about said fuel rods for the generation of steam;
   an upper tie plate for attachment to at least some of said fuel rods to maintain said fuel rods upstanding and permitting the exit of water and generated steam;
   a fuel bundle channel extending from said lower tie plate to the vicinity of said upper tie plate, and surrounding said fuel rods therebetween for producing an isolated flow region through said matrix of upstanding fuel rods for the generation of steam by nuclear reaction within said fuel rods;
   a first plurality of said fuel rods being full length fuel rods for extending fully between said upper and lower tie plates; and,
   a second plurality of said fuel rods being part length fuel rods for extending part way from a supported disposition on said lower tie plate to a point of fuel rod termination below said upper tie plate whereby a vacated vertical interval is defined between the upper end of said part length fuel rod and said upper tie plate;
   the improvement to said first plurality of full length fuel rods comprising in combination:
   said full length fuel rods including a first lower region having a first and smaller diameter containing said pellets of fissionable material; and,
   at least some of said full length fuel rods including an upper region containing said plenum which is devoid of fuel pellets having a second and larger diameter for providing to said plenum an expanded volume whereby the flow area overlying said part length fuel rods defines additional outflow area adjacent said plenums and the active length of fissionable pellets within said full length fuel rods can be increased.

2. The invention of claim 1 and wherein said plenum region of said full length fuel rods is bell shaped between said lower small diameter region of said fuel bundle containing said fuel rods and said upper larger diameter region containing said plenum.

3. The invention of claim 1 and wherein said plenum region of said full length fuel rods is cylindrically shaped between said lower small diameter region of said fuel bundle containing said fuel rods and said upper larger diameter region containing said plenum.

4. The invention of claim 3 and wherein said plenum region of said full length fuel rods telescopes over said active fuel region of said fuel rods.

5. The invention of claim 4 and wherein said plenum region of said full length fuel rods is welded peripherally over and to said active fuel region of said fuel rods.

6. A nuclear fuel bundle comprising in combination:
a matrix of upstanding fuel rods;
each said fuel rod including a surrounding cylindrical cladding;
means sealing said cladding at both ends;
a plurality of fuel pellets of fissionable material stacked in the sealed interior of said fuel rods along an active length of said fuel rods;
a region of each said fuel rods being devoid of said fuel pellets of fissionable material for defining a plenum for enabling gases of fission from said pellets of fissionable material to accumulate in said plenum;
a lower tie plate for supporting said matrix of fuel rods and permitting the upward inflow of water about said fuel rods for the generation of steam;
an upper tie plate for attachment to at least some of said fuel rods to maintain said fuel rods in upstanding and permitting the exit of water and generated steam;
a fuel bundle channel extending from said lower tie plate to the vicinity of said upper tie plate, and surrounding said fuel rods therebetween for producing an isolated flow region through said matrix of upstanding fuel rods for the generation of steam by nuclear reaction within said fuel rods;
a first plurality of said fuel rods being full length fuel rods for extending between said upper and lower tie plates; and,
a second plurality of said fuel rods being part length fuel rods for extending part way from a supported disposition on said lower tie plate to a point of fuel rod termination below said upper tie plate whereby a vacated vertical interval is defined between the upper end of said part length fuel rod and said upper tie plate;
said full length fuel rods including a first lower region having a first and smaller diameter containing said pellets of fissionable material; and,
at least some of said full length fuel rods including an upper region containing said plenum having a second and larger diameter for providing to said plenum an expanded volume whereby the flow area overlying said part length fuel rods defines additional outflow area adjacent said plenums and the active length of fissionable pellets within said full length fuel rods can be increased.

7. The invention of claim 6 and wherein at least some of said full length fuel rods at said upper region containing said plenum have said second and larger diameter for providing to said plenum an expanded volume adjacent to said vacated vertical interval overlying said part length fuel rods whereby said vacated vertical interval overlying said part length fuel rods permits exit of water and generated steam from said fuel bundle without undue pressure drop.

8. The invention of claim 6 and wherein said plenum region of said full length fuel rods is bell shaped between said lower small diameter region of said fuel bundle containing said fuel rods and said upper larger diameter region containing said plenum.

9. The invention of claim 6 and wherein said plenum region of said full length fuel rods is cylindrically shaped between said lower small diameter region of said fuel bundle containing said fuel rods and said upper larger diameter region containing said plenum.

10. The invention of claim 6 and wherein said plenum region of said full length fuel rods telescopes over said active fuel region of said fuel rods.

* * * * *